United States Patent Office 3,413,219
Patented Nov. 26, 1968

3,413,219
COLLOIDAL HYDROUS OXIDE HYPER-FILTRATION MEMBRANE
Kurt A. Kraus and James S. Johnson, Oak Ridge, Tenn., assignors to the United States of America as represented by the United States Atomic Energy Commission
No Drawing. Filed May 9, 1966, Ser. No. 548,422
2 Claims. (Cl. 210—23)

ABSTRACT OF THE DISCLOSURE

A method of making a solute-rejecting permeable membrane comprising passing an aqueous phase containing hydrous metal oxide colloidal particles through a permeable substrate having pores with diameters of 30 A. to 20 microns.

---

The invention described herein was made in the course of, or under, a contract with the United States Atomic Energy Commission and in the course of work performed for the Office of Saline Water of the United States Department of the Interior.

Our invention relates to hyperfiltration, or reverse osmosis methods of reducing the concentration of low-molecular-weight solutes in water by passing an aqueous solution through a permeable membrane under pressure.

Co-pending co-assigned application Ser. No. 504,272, filed Oct. 23, 1965, for "Method of Making a Salt-Rejecting Membrane," discloses a method of making salt-rejecting membranes by passing an aqueous phase containing a dispersible material through a porous substrate. The dynamic membranes described therein, in addition to the advantages of in situ formation, high salt rejection values, and high flow rates, have the advantage that their salt-rejecting characteristics may be maintained at a high level by the addition of small quantities of membrane-forming material to the solution to be treated. As disclosed in this co-pending application the water-soluble salts of the polyvalent metals capable of forming hydrous metal oxides form a salt-rejecting membrane when an aqueous phase containing them is passed through a permeable body.

We have discovered a method of making an improved membrane using salts of these polyvalent metals and in accordance with our invention we have provided, in a method of forming a dynamic membrane capable of rejecting solutes comprising passing an aqueous phase containing a hydrolyzable polyvalent metal salt through a permeable substrate, the step comprising treating said metal salt to form colloidal particles prior to its contact with said substrate.

These materials when colloidal, i.e., when particles having diameters from 0.005 to 0.2 micron are present, have the capacity of forming a dynamic membrane having superior separative properties. These dimensions refer to the basic crystallite sizes; the crystallites may further aggregate to form agglomerates. The membrane is highly permeable; it has highly efficient salt-rejecting properties; and the salt rejection value and flow rate remain stable over an extended period of time.

Although the exact mechanism by which salt rejection is achieved is not known, it appears to involve the formation of a thin, ion-exchange-active, rejecting layer on the feed-substrate interface; salt rejection would then occur because of the salt-exclusion properties typical of the hydrous oxide ion exchangers with substantial charge densities. Hydrous oxides are known to have ion exchange properties, and in general tend to be anion exchangers in acid solution and cation exchangers in basic solution. Details of these properties may be found in "Ion Exchange Properties of Hydrous Oxides" by K. A. Kraus, H. O. Phillips, T. A. Carlson, and J. S. Johnson, Proceedings of the Second United Nations International Conference on the Peaceful Uses of Atomic Energy, Volume 28, pp. 3–16, Geneva, 1958.

With ion exchange membranes of this type the concentration of any salt having a monovalent counter ion may be reduced whether the co-ion is monovalent or polyvalent; the concentration of salts with polyvalent co-ions can usually be reduced more effectively than those with monovalent co-ions. The presence of polyvalent counter ions, however, usually decreases the salt rejection value of these hydrous oxide type dynamic membranes.

In carrying out our process a dynamic membrane is established by passing an aqueous phase containing a colloidal hydrous oxide through a porous substrate. As is disclosed in application Ser. No. 504,272, the permeable substrate may be of any material capable of maintaining its integrity under the pressures involved and in the presence of water and its dissolved salts. The chemical nature of the substrate is not significant, and materials of such widely diverse natures as metal filters, porcelain filters, sintered glass, porous carbon, and organic materials such as porous paper may be used.

The diameters of the pores in the substrate may range from 30 A. to about 20 microns and the preferred pore diameter range is from 0.1 to 5 microns.

Any polyvalent metal salt capable of forming a colloidal hydrous metal oxide may be used to form a dynamic membrane in our process. Examples of typically useful salts are those of tri- and tetra-valent metals such as iron, zirconium, tin (IV), and thorium. In view of earlier observations on ion exchange properties of hydrous oxides, it is expected that colloidal dispersions of the hydrous oxides of pentavalent metals [e.g., Nb(V) and Ta(V)] and of hexavalent metals [e.g., U(VI)] will also be effective.

In our process colloidal particles must be formed from the polyvalent metal salt, and methods of forming colloidal aggregates are well known in the art. We have found that excellent results may be achieved by heating an aqueous solution of the hydrous metal oxide or by adjusting the pH until a turbid solution is obtained.

The concentration of colloidal hydrous oxides in the solution used to form the dynamic membrane varies somewhat with the oxide used, but usually ranges upward from 10 parts per million. After formation, the membrane will continue to have rejecting properties for a day or more, though rejection gradually decreases. If, however, a small concentration of additive, sometimes as little as 0.1 part per million, is kept in the solution, rejection properties are maintained. Continued presence of additive also repairs defects which may appear in the membrane.

The membrane formed by our process is capable of separating a feed stream into enriched and depleted streams regardless of the initial concentration of the solute. The degree of concentration change in a single pass through the barrier is influenced by the species of salt present, the concentration of the salt, the size of the pores in the substrate, the pressure used to force liquid through the membrane, and the rate of flow of liquid parallel to the membrane surface.

The pressure used must be greater than the difference in the osmotic pressure between the permeating and feed solutions. The hydrous oxide additives form stable membranes on substrates having pores in the upper end of the size range more readily than the additives previously disclosed, and therefore with them less pressure drop occurs in the substrate, and use of energy in hyperfiltration is more efficient. A pressure as low as 50 pounds per square inch will give good salt rejection values at a moderate flow rate and the conditions for lowest unit costs for product may include pressures below 500 pounds per square inch.

In our process, as in all hyperfiltration processes, the concentration of solute at the membrane must not be permitted to increase excessively over that of the feed solution. Concentration polarization and its attendant increase in the concentration of solute in the product can be minimized by circulation of the feed solution past the membrane at a rate high enough to maintain the concentration of salt at the membrane near the concentration of salt in the feed solution or by use of means to promote turbulence.

Having thus described our invention the following examples are offered to illustrate it in more detail.

Example I

A permeable silver frit having a nominal pore diameter of 0.8 micron was mounted in hyperfiltration apparatus adapted to pass an aqueous solution under pressure across one face. A 0.02-molar NaCl feed was circulated past the frit at a pressure of 25 pounds per square inch. The flow through the frit was over 35,400 gallons per day per square foot (g.p.d./ft.$^2$) with no NaCl rejection. To this solution was added a 0.1-molar FeCl$_3$ solution, which had been boiled to form a colloidal dispersion, to bring the feed solution to 0.0005 molar Fe (III). At the end of two hours the permeation rate was 70 g.p.d./ft.$^2$ at 35 atmospheres and the rejection of NaCl was 60 percent.

In a similar run using unboiled FeCl$_3$ the rejection of NaCl was about 30 percent.

As can be seen from Example I colloidal ferric oxide forms salt-rejecting barrier having a high flow rate even at a low pressure.

Example II below shows the salt rejection and flow rates achieved using another hydrous metal oxide.

Example II

A dynamic hydrous Zr(IV) oxide membrance was formed on a silver frit identical to that of Example I by contacting it with a 0.02-molar NaCl solution containing a colloidal dispersion of 0.001 molar Zr(IV). The colloidal hydrous Zr(IV) was formed by boiling a 0.25-molar ZrOCl$_2$ solution for several hours at which time precipitation became barely apparent. An aqueous solution 0.025 molar in BaCl$_2$ and 0.05 molar in HCl was then passed over the membrane at 500 p.s.i. The rejection of BaCl$_2$ was 68 percent and the flow rate through the membrane was 130 g.p.d./ft.$^2$. A result different from those in Example I was the observation that the concentration of HCl in the effluent was 11 percent higher than its concentration in the feed. This shows that separations of solutes from one another, as well as separations of solute from solvent, are possible with this membrane.

In following Example III a different substrate and a different salt were tested.

Example III

An aqueous solution 0.01 molar in MgCl$_2$ and containing 0.0001 molar boiled ZrOCl$_2$ was passed through a porous carbon tube 40 centimeters long, 11 millimeters in O.D., 5.35 millimeters in I.D., and having an estimated pore diameter of 0.2 micron. At 600 p.s.i. the rejection of MgCl$_2$ was 85 percent at a permeation rate of 130 g.p.d./ft.$^2$. Salt rejection and product flow rates with this type of configuration have remained stable in operations covering 60 hours.

Example IV

An additive sock containing 1.3 molar Th(IV) as colloidal hydrous oxide was prepared by dispersing precipitated hydrous thorium oxide in a small amount of thorium nitrate solution. Enough of this solution was added to a 0.02-molar NaCl solution to bring it to 0.001 molar Th(IV). This solution dynamically deposited on a 0.8-micron silver frit a layer rejecting 58 percent of total chloride, at a transmission rate of 57 g.p.d./ft.$^2$ at 500 pounds per square inch.

At the pH values of the solutions in Examples I–IV, the hydrous oxides were in anion exchange form. Example V demonstrates that rejections can also be attained with hydrous oxides in the cation exchange form.

Example V

A hydrous zirconium oxide membrane which was formed on a 0.8-micron Ag frit with 0.0005 molar boiled ZrOCl$_2$ solution, and therefore in the anion exchange form, rejected 70 percent of chloride from a 0.02-molar NaCl–0.0001-molar Zr(IV) solution and 89 percent from a 0.01-molar MgCl$_2$–0.0001-molar Zr(IV) solution (150 g.p.d./ft.$^2$ at 500 pounds per square inch). In a later experiment it rejected 18 percent of chloride from a 0.02-molar NaCl–0.0001-molar NaOH–0.0001-molar Zr(IV) tion (transmission through the membrane here also 150 g.p.d./ft.$^2$). The measured pH of the last solution was 11; at this acidity, hydrous zirconium oxide is a cation exchanger.

The foregoing examples are intended to illustrate, not to limit, our invention. It is obvious that techniques other than boiling may be used to obtain colloidal particles, and that changes in the types or concentrations of hydrous oxide may be made.

We claim:
1. A method of separating an acid from a metal salt and concentrating said acid comprising the steps of:
   (1) forming a dynamic membrane on a permeable substrate containing pores having diameters of 30 A. to 20 microns by contacting a porous face of said substrate with an aqueous solution containing colloidal particles formed from a polyvalent metal capable of forming a hydrous metal oxide; and
   (2) passing a feed solution containing said acid together with said metal salt over said face of the resulting substrate at a pressure and a flow velocity sufficient to force a first portion of feed solution through the pores in said substrate and a second portion of feed solution parallel to the face of said substrate, said first portion thereby becoming depleted in metal salts and enriched in acid and said second portion becoming enriched in metal salts and depleted in acid.

2. The method of claim 1 wherein hydrochloric acid is separated from metal chloride.

References Cited

UNITED STATES PATENTS

| 760,364 | 5/1904 | Woolworth | 210—502 X |
|---|---|---|---|
| 3,272,737 | 9/1966 | Hansen et al. | 210—500 X |
| 3,331,772 | 7/1967 | Brownscombe et al. | 210—22 X |
| 3,332,737 | 7/1967 | Kraus | 210—24 X |

FOREIGN PATENTS

| 310,792 | 1/1922 | Germany. |
|---|---|---|
| 262,131 | 5/1927 | Great Britain. |
| 410,739 | 5/1934 | Great Britain. |

OTHER REFERENCES

U.S. Saline Water Conversion Report (1964), Received in Patent Office July 29, 1965, pp. 46–48.

REUBEN FRIEDMAN, *Primary Examiner.*

F. A. SPEAR, JR., *Assistant Examiner.*